United States Patent [19]

Fossum

[11] Patent Number: 5,245,700
[45] Date of Patent: Sep. 14, 1993

[54] ADJUSTMENT OF Z-BUFFER VALUES FOR LINES ON THE SURFACE OF A POLYGON

[75] Inventor: Gordon C. Fossum, Austin, Tex.

[73] Assignee: International Business Machines Corporation, Armonk, N.Y.

[21] Appl. No.: 439,902

[22] Filed: Nov. 21, 1989

[51] Int. Cl.$^5$ .............................................. G06F 15/62
[52] U.S. Cl. ................................... 395/122; 395/121; 395/125
[58] Field of Search ............................... 364/518–522; 350/717, 729; 395/119–122, 133–135, 125

[56] References Cited

U.S. PATENT DOCUMENTS

| 3,816,726 | 6/1974 | Sutherland et al. | 235/152 |
| 4,625,289 | 11/1986 | Rockwood | 364/518 X |
| 4,709,231 | 11/1987 | Sakaibara et al. | 340/729 |
| 4,710,876 | 12/1987 | Cline et al. | 364/414 |
| 4,715,005 | 12/1987 | Heartz | 364/521 |
| 4,812,988 | 3/1989 | Duthuit et al. | 364/522 |
| 4,841,292 | 6/1989 | Zeno | 340/736 |
| 4,855,934 | 8/1989 | Robinson | 364/521 |
| 4,855,938 | 8/1989 | Gonzalez-Lopez et al. | 364/522 |
| 4,918,626 | 4/1990 | Watkins et al. | 364/522 |
| 4,951,232 | 8/1990 | Hannah | 340/729 X |

FOREIGN PATENT DOCUMENTS 0176373  3/1989  Japan .

OTHER PUBLICATIONS

B. J. Sheperd, IBM Technical Disclosure Bulletin, "Hardware Manipulation of Three-Dimensional Graphics" vol. 14, No. 12, May 1972.

D. Gordon, R. A. Reynolds, Dept. of Radiology, University of Penn., "Image Space Shading of Three-Dimensional Objects" Nov. 1983.

A. C. Tan, R. Richards, Medical Information, "Pseudo-shading technique in the two-dimensional domain: a postprocessing algorithm for enhancing the Z-buffer of a three-dimensional binary image" vol. 14, No. 2, pp. 149–156, 1989.

Primary Examiner—Gary V. Harkcom
Assistant Examiner—Almis Jankus
Attorney, Agent, or Firm—Mark E. McBurney

[57] ABSTRACT

A system and method in a graphics environment ensures that a line drawn upon the surface of a polygon is always visible to a user of the graphics system. In a Z-buffered environment the range of depth values contained therein are set to the 75% of the total capacity which is considered closest to the surface of a display screen. The line is then drawn into this 75% set of Z-buffer depth values. A shift is then computed, based upon the normal to the polygon in device coordinates. This shift is then added to the previously set 75% range of Z-buffer depth values. The polygon is then drawn at a depth equal to the previously set range plus the shift. Thus, the line will always be visible since, the polygon surface will always be considered by a graphics adapter to be deeper than the line contained on the surface thereof.

8 Claims, 3 Drawing Sheets

ADJUSTMENT OF Z-BUFFER VALUES FOR LINES ON THE SURFACE OF A POLYGON

BACKGROUND OF THE INVENTION

The overall goal of the present invention is to be able to render a three dimensional scene, in a computer graphics system, including polygons having lines drawn thereacross, by using a graphics adapter containing a Z-buffer. Generally, graphics adapters cause surface lines to have disappearing segments, due to insufficient data, as discussed in greater detail below.

The majority of graphics adapters include a Z-buffer which stores values relating to the depth of a picture element (pixel). Z-buffers provide for hidden surface removal, such that when the adapter is preparing to paint a pixel with a color, the Z-buffer can check to see if the pixel to be painted is at a depth greater (deeper) than the existing pixel displayed on the screen. If the pixel to be painted is deeper, then the adapter does nothing. Otherwise, it paints the pixel and updates the Z-buffer with the new depth value.

A problem exists when it is desired to paint a line upon the surface of a polygon. Mathematically, the line and surface are at the same depth. That is, the surface and the line have the same value stored in the Z-buffer. Errors occur because the line color is painted for some pixels, whereas the polygon surface color is painted for others. Further, the process used to paint the line is more accurate than the plurality of pixels provided on a display. Specifically, the line painting process is forced to use pixels not actually contained on the line, and since the normal to the surface upon which the line resides is unknown, the process must estimate the depth of the off-line pixels. Thus the line pixels, for which the process erroneously estimates the depth of the line to be deeper than the polygon surface, will seem to disappear.

It should be noted that it may be possible to associate a normal with any off-line pixels by making significant changes to the hardware design or microcode of the currently used graphics adapters. However, these types of changes would require retrofitting, or microcode reprogramming of each graphics adapter which would be an extremely time consuming and expensive process. Therefore, it would be very desirable to provide a software solution to the problems caused by these errors.

SUMMARY OF THE INVENTION

In contrast to the prior art, the present invention provides a method of setting the relationship between lines and the polygon surface such that the surface of the polygon is viewed as being deeper, thereby allowing the lines to be visible (i.e. painted). A standard Z-buffer generally has a possible range of depth values from $-2^{}23$ to $2^{}23-1$ which are characterized such that the larger values are deeper into the screen, or display. Therefore, to ensure that the lines are painted rather than the polygon surface, when both have an identical mathematical depth, the polygon must be considered to be deeper than the line and thereby overwritten by the graphics adapter, when a line on that polygon is considered. The present invention achieves this goal by always characterizing the depth values associated with a polygon surface as larger, or deeper than the line depth values. This is accomplished by computing an offset, or shift amount once for each polygon, as a function of the normal to the polygon surface, and adjusting the adapter's output Z-buffer range for each polygon painted relative to the output range used for all lines. For example, if a polygon is oriented such that its normal is pointing directly out of the screen, then the shift will be minimal. However, if the polygon is oriented virtually on its side, or edge-on, then the offset will be large to compensate for the larger errors that a occur in the depth estimating process, contained in the line drawing portion of the present invention.

It should be noted that the effect of the Z-buffer adjustment in drawing the polygon will not change the appearance of the polygon. The possible exceptions being insignificant changes in color based upon depth cueing (for example, one level of color intensity out of a total of 256, which is not discernible to the human eye), or an isolated pixel error at the point of intersection between the polygon surface and any lines non-planar with respect thereto. For these reasons, it is important to keep the Z-buffer adjustment as small as possible.

In accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENT

Figure 1:
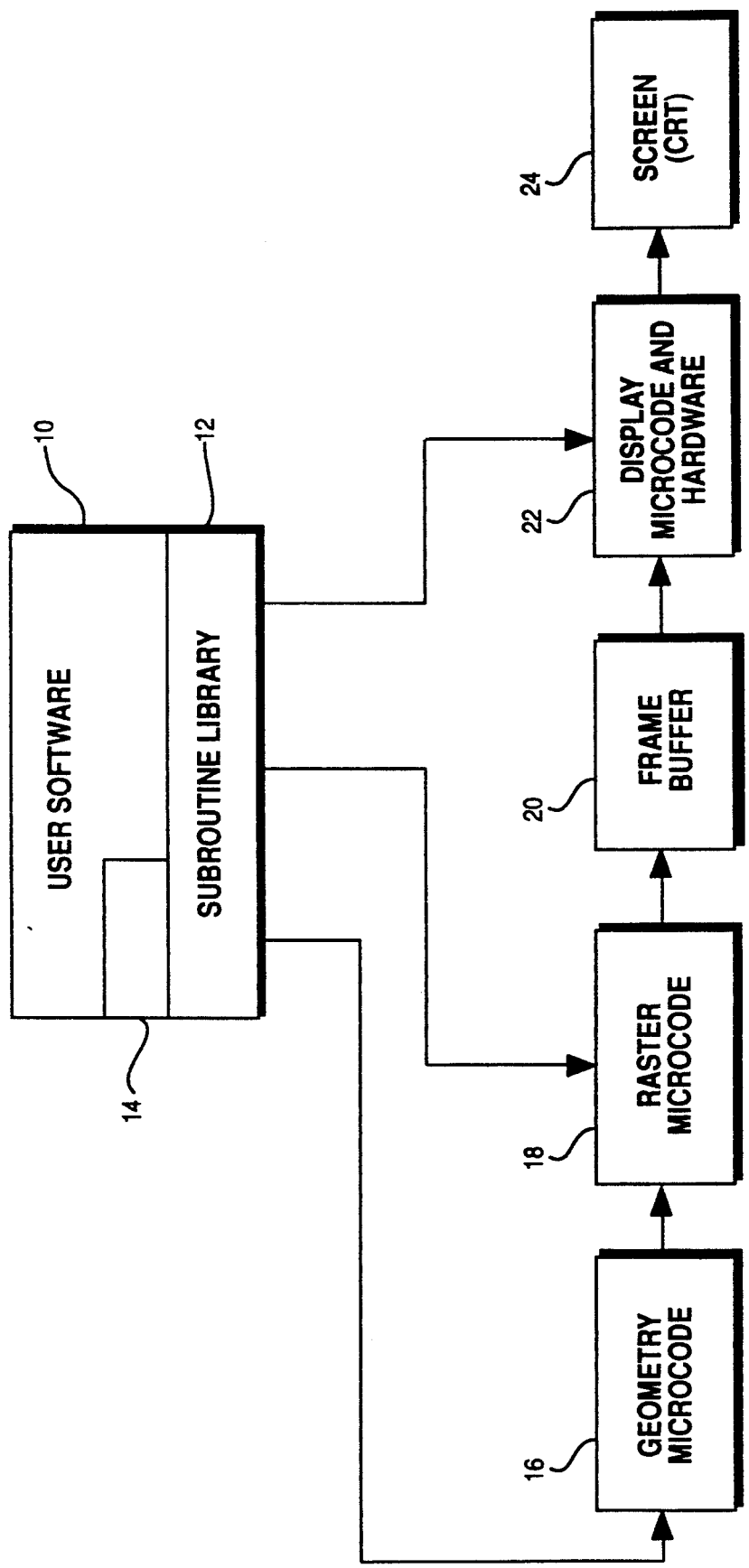
FIG. 1 is a block diagram of a system utilizing the Z-Buffer adjustment process of the present invention.

Referring to FIG. 1, a system utilizing the process of the present invention is shown in block diagram form. A user software program 10, includes a subroutine library 12, and allows a graphics user to request specific program applications. The user software 10 provides the actual request to draw a polygon, having lines contained on a surface thereof. The present invention is contained within the user software 10 and depicted by reference numeral 14. A process is provided which allows the lines contained on the polygon surface to be visible regardless of any errors caused, due to the fact that the polygon surface and line are considered to be at the same mathematical depth. Reference numeral 16 represents geometry microcode which receives information from subroutine library 12, such as matrices, modeling coordinate vertices, and the like, which relate to the polygon surface and line being considered. The geometry microcode 16 then transforms the received polygon and line information into device coordinate values. This transformation effectively maps "world coordinates," which are coordinates displayed as seen from the eye of a viewer, into coordinates which are device dependent. Device coordinates project the polygon surface and line as a function of the display environment. That is, device coordinates relate to the actual display hardware being used such as a screen surface area and Z-buffer depth value. The device coordinates are then supplied to the raster microcode 18, which also receives information and instructions from the subroutine library 12 and user program 10. The raster microcode 18 uses the device coordinates and information from library 12 to determine the color (r,g,b) values and Z-buffer depths for each pixel. The use of raster microcode 18 and geometry microcode 16 herein refers to concepts that are exemplified by workstations such as those manufactured by Silicon Graphics, Inc. Geometry microcode is roughly that portion of the hardware/firmware that transforms vertices into the coordinate system of the display device, and raster microcode is that portion of the hardware/firmware that interpolates the interiors of polygons, correctly loading colors and Z-buffer values into the storage device, or bit planes of the display device. A frame buffer 20 actually assigns and stores the r,g,b value for each pixel. It should be noted that the colorization (r,g,b) value for each pixel is computed subject to the data contained within the Z-buffer for that pixel. Therefore, only r,g,b values are transmitted to display microcode and hardware 22 which then converts these values to analog voltage signals capable of being displayed upon a screen 24, such as a CRT. The present invention processes the information and instructions provided to the raster microcode 18 such that the r,g,b values for the pixels corresponding to the line and polygon surface are displayed on screen 24 and the line is always visible.

Figure 2:
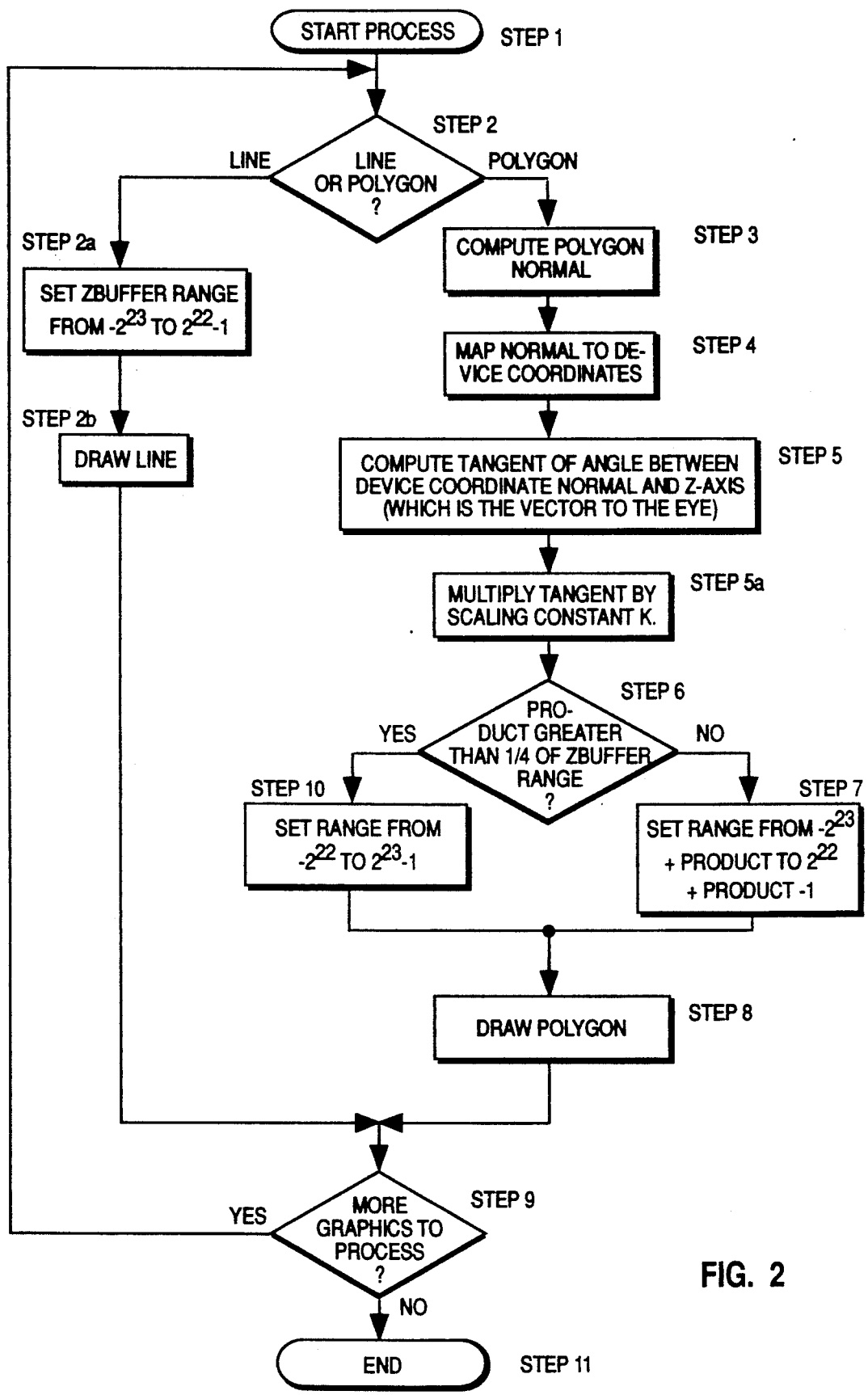
FIG. 2 is a flowchart representing the process of the present invention.

FIG. 2 is a flowchart representing the process of the present invention, where at step 1, the process is initiated. At step 2, it is determined whether the line or polygon is to be drawn first. If at step 2 the line is initially drawn, then at step 2a, a Z-buffer is set to a specific range of values. Generally, most graphics adapters include a Z-buffer, which is merely a storage device capable of recording a depth value relating to each pixel. A Z-buffer is usually used for hidden surface removal. That is, if a first line is viewed as being deeper into the screen than a corresponding line, which includes some of the same pixels, then the pixels corresponding to the deeper line are ignored. Thus, the line nearer the viewer (the surface of the display) is shown. Often, Z-buffers having a 24-bit capacity are utilized which provide a range of values from $-2^{}23$ to $(2^{}23)-1$. Step 2a sets this range of Z-buffer values to a percentage of the total range of depth values, such as, seventy-five percent (75%) of the total range. To set the Z-buffer range all that is generally required is to set a pair of values in registers which are then used by the rasterizing microcode 18. The default range is thus computed as being from $-2^{}23$ to $(2^{}22)-1$ (Z-buffers are generally configured such that the largest positive values are deeper, or farther into the screen surface). Therefore, step 2a effectively limits the range of Z-buffer depth values to that 75% of the values which are considered to be closest to the screen surface. At step 2b, the line is then drawn (pixels corresponding to the line are painted) into the range of Z-buffer values previously set to the closest 75%. This is a relatively simple task since a program can specify that a line be mapped into any subset of Z-buffer values. Therefore, the lines will always be drawn into that portion of the Z-buffer which is closest to the screen surface, i.e. the deepest point possible for a line would be at 75% of the total depth value of a Z-buffer.

Step 3 computes a normal to the polygon, which is accomplished by taking any three non-collinear points on the polygon surface and taking the cross product thereof. The cartesian coordinates of these points are known by the user software 10, therefore it is a relatively simple operation to determine the normal to the surface.

The coordinates of the normal determined at step 3 are then mapped into device coordinates at step 4. Device coordinates relate to a device dependent coordinate system and are commonly used to represent the display space of the device. Therefore, the computed normal mapped to device coordinates relates to the particular display system graphics adapter being utilized and the whole scene being displayed, rather than a particular polygon surface having a line drawn thereon. Mapping the normal into device coordinates is accomplished using geometry microcode 16 and the inverse transpose of the viewing and/or projection matrices, as previously discussed with reference to FIG. 1.

Next, at steps 5 and 5a an amount of shift, or offset between the depth values corresponding to the polygon surface and line is computed. This shift is calculated using the following expression, which is the tangent of an angle between the computed normal to the polygon surface and a vector running from the polygon surface to the eye of a viewer, or user of the display 24 (this vector, in device coordinates, is parallel to the Z-axis, thus considerably simplifying the computation).

$$\frac{\sqrt{(x^*x) + (y^*y)}}{/z/}$$

The x,y,z values of the above tangent expression are the components of the device coordinate normal, as determined in step 4. This computed expression is then multiplied (at step 5a) by a tuning constant K, resulting in the actual shift. The purpose of a tuning constant is to compensate for the different levels of resolution, or detail between a 24-bit Z-buffer (with $2^{}24$ different possible values) and the pixels on the screen (typically having no more than $2^{}11$ values in the X axis, or Y axis direction along the screen surface). The constant K minimizes any errors which may occur from too small a shift (a polygon oriented substantially "edge on" may show line portions which are occasionally invisible), or too large a shift (the displayed colors may be slightly off due to depth cueing considerations, typically any error will be limited to one level of color intensity out of 256 which is not discernible to the naked eye).

It should also be noted that, too large a shift may cause a single pixel error to be visible at the interaction of the polygon and a non-planar line. At this intersection, slightly more of the line will be visible, due to its apparent movement relative to the polygon surface. With regard to the present invention, a tuning constant value of 4096 has been utilized and found to give good results. This value was used on a full-screen image. For images displayed within smaller areas, larger tuning constants would be appropriate, since the disparity in levels of resolution is larger. A wide range of constants have been determined to give good results for a 24-bit Z-buffer. Therefore, any tuning constant value K producing reasonable results can be used without departing from the scope of the present invention.

At step 6 it is determined whether the computed shift, being the tangent expression multiplied by the constant K, is greater than twenty-five (25%) of the Z-buffer range as set in step 2a. If so, then the process of the present invention limits the shift to 25% of the Z-buffer range by setting the Z-buffer range from $-2^{}22$ to $(2^{}23)-1$ (step 10). If the computed shift is less than or equal to 25%, then step 7 sets the Z-buffer range for the polygon to be from $-2^{}23+$shift to $2^{}22+($shift$-1)$. This shift is the difference between the depth value of any line which may be drawn on the polygon surface and the effective depth value of the polygon surface. The shift value must be limited to 25%, since any shift greater than 25% would result in invalid values for the Z-buffer range. The polygon surface is thus forced to have a larger Z-buffer depth value than the line, which ensures that the previously drawn line will always be visible and that the polygon surface will always be considered to be deeper than this line.

Step 8 provides for drawing, or painting the pixels of that portion of the polygon which is not considered deeper than the line, and which does not have pixels corresponding to the pixels of the line. Since, both the polygon and line have now been drawn, the process of the present invention determines, at step 9, whether there are any remaining graphics programs to process. If so, the process returns to step 2 which determines if it is a line, or polygon requiring processing. If no graphics programs remain to be processed, the process continues to step 11 and ends.

Figure 3:
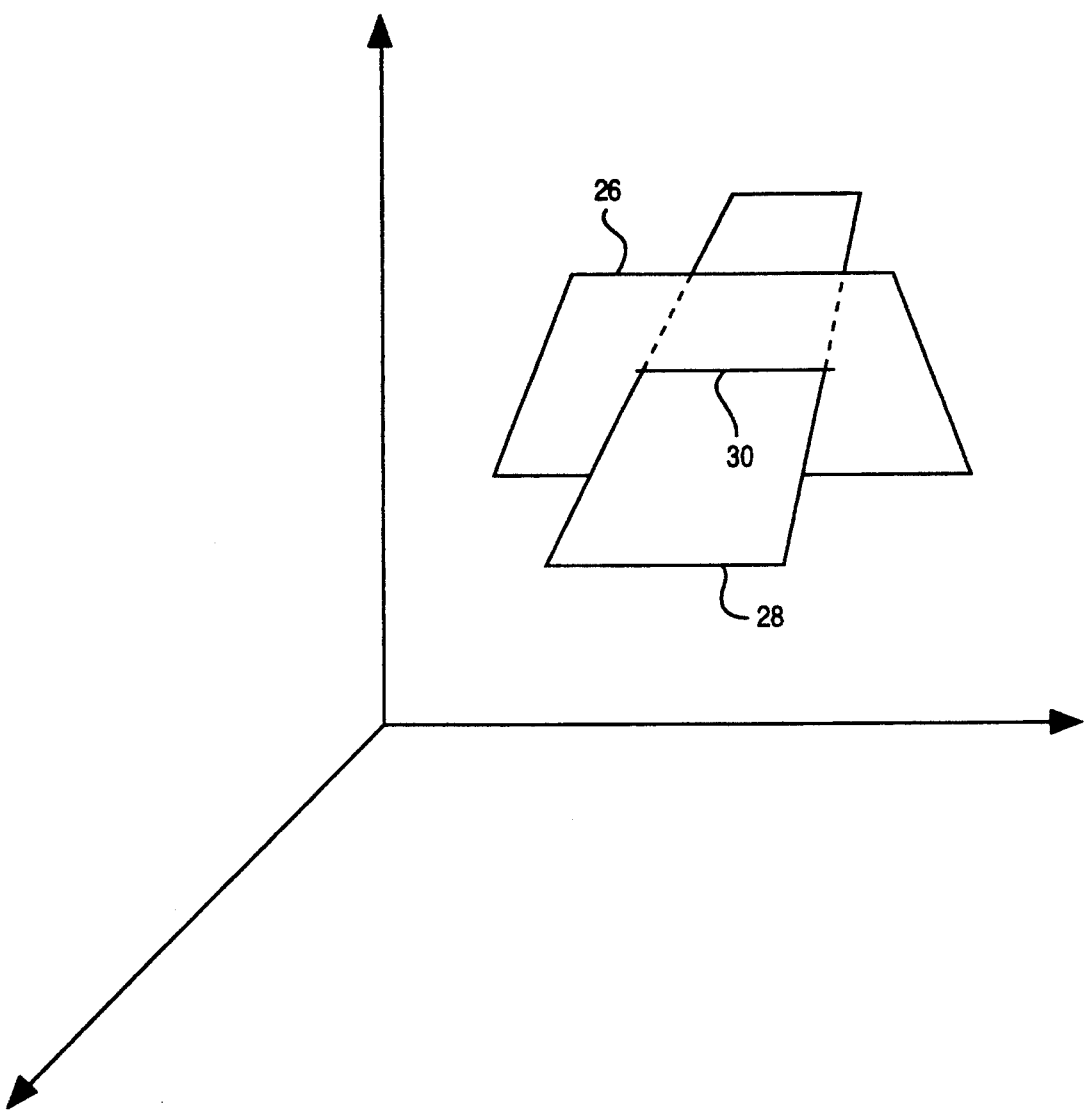
FIG. 3 depicts a polygon in a cartesian coordinate system having a line drawn upon the surface thereof.

Referring to FIG. 3, a pair of intersecting polygons 26, 28 are shown in a cartesian coordinate system. Further, the line 30 is shown as being on the surface of polygon 26. The line 30 is intended to be drawn in a color contrasting to either polygon 26 or 28. An example of the present invention will now be described with reference to FIGS. 2 and 3. First, for simplicity, assume a Z-buffer having a capacity of 1000 (0-999) depth values. Step 1 initiates the process, step 2 determines if a line or polygon is being processed and step 2a sets the Z-buffer range to 75% (for this example) of the total capacity (0-749 range of depth values) which is nearest the screen surface. Then, line 30 is drawn into this range, at step 2b. Step 3 computes a normal to the plane (polygon) 26 in cartesian coordinates, and step 4 maps this normal into device coordinates.

The amount of Z-buffer shift is then computed in steps 5 and 5a. The tangent expression is computed in step 5 and then multiplied by a constant K in step 5a. Assume for the purposes of this example that the shift = 15. Step 6 determines whether this shift is greater than 25% of Z-buffer capacity. If so, then the shift is set equal to 25% (step 10). However in this case, 15 is less than 25% of the Z-buffer range (1000). Therefore, the process continues to step 7 where the Z-buffer range for the polygon 26 is set. For this example, the polygon Z-buffer range will be 0+15 to 749+15, and it can be seen how polygon 26 will always have a Z-buffer depth value in the range of 15 to 764. These values are in a range (15-764) deeper than the line Z-buffer depth value range (0-749). Consequently, the portion of polygon 26, intersecting line 30 will always be viewed as deeper into the display and thus ignored by the raster microcode 18 when determining r,g,b values. A step 8, the polygon 26 is drawn and step 9 determines whether any other graphics programs need to be processed. In this case, processing is complete and the process of the present invention ends at step 11.

Although certain preferred embodiments have been shown and described, it should be understood that many changes and modifications may be made therein without departing from the scope of the appended claims.

What is claimed is:

1. A method of three dimensionally displaying on a computer graphics system having a Z-buffer and a display, a polygon having a line contained on a surface of the polygon, said Z-buffer for storing depth values associated with said polygon and said line, said method comprising the steps of:

setting a range of depth values corresponding to a percentage of all of said depth values in said Z-buffer;

drawing said line on said display wherein the depth value for said line falls within said range;

shifting said range of said depth values within said Z-buffer by a shift amount dependent upon an angle between a normal vector to said polygon surface and a vector perpendicular to said display; and drawing said polygon on said display at a depth within said shifted range, said polygon surface having a greater depth within said Z-buffer than said line.

2. A method according to claim 1 wherein said step of shifting comprises the steps of:

computing a normal to said polygon surface;

mapping coordinates of said computed normal into coordinates dependent upon a specific display device;

computing said shift amount by calculating the tangent of said angle between the normal vector to the polygon surface and the vector perpendicular to said display;

limiting said shift amount to a predetermined value; and adding said shift amount to each depth value within said range of depth values.

3. A method according to claim 2 wherein said step of computing a shift amount comprises the step of:

multiplying said calculated tangent by a non-zero positive number to obtain said shift amount.

4. A method according to claim 2 wherein said step of limiting said shift amount comprises the steps of:

determining whether said shift amount corresponds to a predetermined number of all said depth values of said Z-buffer; and limiting said shift amount to said predetermined number of said depth values.

5. A computer graphics system, for three dimensionally displaying a polygon having a line contained on a surface of the polygon, comprising:

a Z-buffer for storing depth values associated with said polygon and said line;

means for setting a range of depth values corresponding to a percentage of all said depth values within said Z-buffer;

means for drawing said line on a display at a depth value falling within said range of depth values;

means for shifting said range of said depth values in said Z-buffer by a shift amount dependent upon an angle between a normal vector to said polygon surface and a vector perpendicular to said display; and means for drawing said polygon at a depth within said range, shifted by said means for shifting, said polygon surface having a greater depth within said Z-buffer than said line.

6. A system according to claim 5 wherein said means for shifting comprises:

means for computing a normal to said polygon surface;

means for mapping coordinates of a normal, computed by said means for computing, into coordinates dependent upon a specific display device;

means for computing a shift amount by calculating the tangent of said angle between the normal vector to the polygon surface and the vector perpendicular to the display;

means for limiting said shift amount to a predetermined value; and means for adding said shift amount to each depth value within said range of depth values.

7. A system according to claim 6 wherein said means for computing a shift amount comprises:

means for multiplying said tangent, calculated by said means for, computing a shift amount by a non-zero, positive number to obtain said shift amount.

8. A system according to claim 6 wherein said means for limiting said shift amount comprises:

means for determining whether said shift amount corresponds to a predetermined number of all of said depth values of said Z-buffer; and means for limiting said shift amount to said predetermined number of said depth values.

* * * * *